US 12,115,835 B2

(12) United States Patent
Woodfield et al.

(10) Patent No.: US 12,115,835 B2
(45) Date of Patent: Oct. 15, 2024

(54) VEHICLE AIR CONDITIONING

(71) Applicant: Dyson Technology Limited, Wiltshire (GB)

(72) Inventors: Daniel James Woodfield, Swindon (GB); Ross Patrick Ferreira, Bristol (GB); Laurent James Peters, Bristol (GB); Roy Edward Poulton, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 407 days.

(21) Appl. No.: 17/279,976

(22) PCT Filed: Sep. 24, 2019

(86) PCT No.: PCT/GB2019/052675
§ 371 (c)(1),
(2) Date: Mar. 25, 2021

(87) PCT Pub. No.: WO2020/065287
PCT Pub. Date: Apr. 2, 2020

(65) Prior Publication Data
US 2022/0032728 A1 Feb. 3, 2022

(30) Foreign Application Priority Data
Sep. 28, 2018 (GB) ...................... 1815862

(51) Int. Cl.
*B60H 1/00* (2006.01)
*B60H 3/06* (2006.01)

(52) U.S. Cl.
CPC ....... *B60H 1/00478* (2013.01); *B60H 3/0641* (2013.01); *B60H 2001/00221* (2013.01)

(58) Field of Classification Search
CPC .............. B60H 1/00478; B60H 3/0641; B60H 2001/00221
See application file for complete search history.

(56) References Cited

U.S. PATENT DOCUMENTS 3,138,934 A    6/1964   Roane
4,280,330 A    7/1981   Harris et al.
(Continued)

FOREIGN PATENT DOCUMENTS

CN     102294946 A    12/2011
CN     203974472 U    12/2014
(Continued)

OTHER PUBLICATIONS

FR2902700A1 mt (Year: 2006).*
(Continued)

*Primary Examiner* — Gordon A Jones
(74) *Attorney, Agent, or Firm* — Tucker Ellis LLP; Michael G. Craig

(57) ABSTRACT

A vehicle comprising a passenger cabin and an air conditioning system is disclosed. The air conditioning system comprises a Peltier device, a first blower for directing a first airflow over a first side of the Peltier device, and a second blower for directing a second airflow over a second side of the Peltier device. The second blower draws the second airflow from inside the passenger cabin, and the second airflow is discharged to outside the passenger cabin.

13 Claims, 7 Drawing Sheets

(56) References Cited

U.S. PATENT DOCUMENTS

| | | | |
|---|---|---|---|
| 4,903,581 A * | 2/1990 | Nilsson | B60H 1/3407 454/124 |
| 4,920,759 A | 5/1990 | Tanaka et al. | |
| 5,096,254 A * | 3/1992 | Sparke | B62D 25/06 296/210 |
| 5,450,894 A | 9/1995 | Inoue et al. | |
| 5,462,482 A | 10/1995 | Grimes | |
| 5,524,439 A | 6/1996 | Gallup et al. | |
| 5,626,021 A * | 5/1997 | Karunasiri | B60H 1/00285 62/3.61 |
| 6,213,198 B1 | 4/2001 | Shikata et al. | |
| 6,430,935 B1 | 8/2002 | Klett et al. | |
| 6,439,658 B1 | 8/2002 | Ganz et al. | |
| 6,662,572 B1 | 12/2003 | Howard | |
| 6,878,054 B2 | 4/2005 | Klesing et al. | |
| 6,896,047 B2 | 5/2005 | Currle et al. | |
| 7,044,537 B2 * | 5/2006 | Schoemann | B60H 1/243 296/146.7 |
| 7,159,651 B2 * | 1/2007 | Ito | B60H 1/12 165/203 |
| 7,836,705 B2 | 11/2010 | Teschner et al. | |
| 8,418,477 B2 | 4/2013 | Klein et al. | |
| 8,443,871 B2 * | 5/2013 | Hayashi | B60H 1/00271 165/277 |
| 2004/0065101 A1 | 4/2004 | Krupp et al. | |
| 2005/0067158 A1 | 3/2005 | Ito et al. | |
| 2007/0000255 A1 | 1/2007 | Elliot et al. | |
| 2007/0107440 A1 | 5/2007 | Ito et al. | |
| 2007/0200398 A1 | 8/2007 | Wolas et al. | |
| 2008/0047277 A1 | 2/2008 | Kim | |
| 2009/0000310 A1 | 1/2009 | Bell et al. | |
| 2009/0000311 A1 | 1/2009 | Kmetz et al. | |
| 2009/0199572 A1 | 8/2009 | Klein et al. | |
| 2010/0222929 A1 | 9/2010 | Ostermeier et al. | |
| 2010/0294455 A1 | 11/2010 | Yang et al. | |
| 2011/0042988 A1 | 2/2011 | Alpert | |
| 2011/0165830 A1 | 7/2011 | Smith | |
| 2011/0250832 A1 * | 10/2011 | Mayr | B60H 3/0608 454/237 |
| 2012/0102973 A1 | 5/2012 | Oh | |
| 2013/0167556 A1 | 7/2013 | Jun et al. | |
| 2014/0060795 A1 * | 3/2014 | Yu | B60H 1/00821 454/152 |
| 2015/0121902 A1 | 5/2015 | Steinman et al. | |
| 2015/0165865 A1 | 6/2015 | Park et al. | |
| 2016/0082806 A1 | 3/2016 | Park | |
| 2016/0229265 A1 | 8/2016 | Sawyer | |
| 2018/0022181 A1 | 1/2018 | Sawyer et al. | |
| 2022/0032729 A1 | 2/2022 | Woodfield et al. | |

FOREIGN PATENT DOCUMENTS

| | | |
|---|---|---|
| CN | 204020475 U | 12/2014 |
| CN | 105857019 A | 8/2016 |
| CN | 107639996 A | 1/2018 |
| DE | 1988092 U | 6/1968 |
| DE | 1680846 B1 | 4/1971 |
| DE | 2139544 A1 | 2/1973 |
| DE | 3539063 A1 | 5/1987 |
| DE | 3644566 A1 | 7/1988 |
| DE | 4204785 A1 | 8/1993 |
| DE | 4207283 A1 | 9/1993 |
| DE | 4432497 A1 | 3/1996 |
| DE | 29812875 U1 | 12/1998 |
| DE | 10101028 A1 | 7/2002 |
| DE | 10206912 A1 | 9/2003 |
| DE | 102007024037 A1 | 11/2008 |
| DE | 102007044466 A1 | 3/2009 |
| DE | 102007063251 A1 | 7/2009 |
| DE | 102010018906 A1 | 12/2010 |
| DE | 102010021331 A1 | 1/2011 |
| DE | 102012004023 A1 | 9/2013 |
| DE | 102012009909 A1 | 11/2013 |
| DE | 102012012448 A1 | 1/2014 |
| DE | 102013009513 A1 | 12/2014 |
| EP | 0287587 B1 | 12/1991 |
| EP | 0569991 A1 | 11/1993 |
| EP | 1236594 B1 | 5/2011 |
| EP | 2497661 A1 | 9/2012 |
| EP | 2886378 A1 | 6/2015 |
| FR | 2598493 A1 | 11/1987 |
| FR | 2843916 A1 | 3/2004 |
| FR | 2865436 A1 | 7/2005 |
| FR | 2902700 A1 | 12/2007 |
| FR | 2913919 A1 | 9/2008 |
| FR | 3002196 A1 | 8/2014 |
| FR | 2914229 A1 | 10/2018 |
| GB | 947231 A | 1/1964 |
| GB | 2201767 A | 9/1988 |
| JP | S47-13848 U | 10/1972 |
| JP | S60-78809 A | 5/1985 |
| JP | S60-213519 A | 10/1985 |
| JP | H3-224818 A | 10/1991 |
| JP | H5-277020 A | 10/1993 |
| JP | H8-11517 A | 1/1996 |
| JP | H11-34647 A | 2/1999 |
| JP | 2003-320843 A | 11/2003 |
| JP | 2005-52298 A | 3/2005 |
| JP | 2005-116698 A | 4/2005 |
| JP | 2006-1392 A | 1/2006 |
| JP | 2006-15852 A | 1/2006 |
| JP | 2006-21572 A | 1/2006 |
| JP | 2006-123718 A | 5/2006 |
| JP | 2006-123874 A | 5/2006 |
| JP | 2006-137405 A | 6/2006 |
| JP | 2006-151252 A | 6/2006 |
| JP | 2006-273146 A | 10/2006 |
| JP | 2006-304854 A | 11/2006 |
| JP | 2007-106339 A | 4/2007 |
| JP | 2007-216742 A | 8/2007 |
| JP | 2007-261326 A | 10/2007 |
| JP | 2007-269053 A | 10/2007 |
| JP | 2009-274587 A | 11/2009 |
| JP | 2009-280149 A | 12/2009 |
| JP | 2009-293837 A | 12/2009 |
| JP | 2010-2082 A | 1/2010 |
| JP | 2010-76652 A | 4/2010 |
| JP | 2011-11712 A | 1/2011 |
| JP | 2011-195066 A | 10/2011 |
| JP | 2011-195078 A | 10/2011 |
| JP | 2013-110897 A | 6/2013 |
| KR | 10-2010-0064987 A | 6/2010 |
| KR | 10-2010-0093722 A | 8/2010 |
| KR | 10-2010-0132166 A | 12/2010 |
| KR | 10-2011-0030281 A | 3/2011 |
| KR | 10-2012-0002685 A | 1/2012 |
| KR | 10-2012-0023874 A | 3/2012 |
| KR | 10-2012-0139508 A | 12/2012 |
| KR | 10-1313899 B1 | 10/2013 |
| KR | 10-2015-0085372 A | 7/2015 |
| SU | 975464 A1 | 11/1982 |
| TW | M480484 U | 6/2014 |
| WO | 99/61269 A2 | 12/1999 |
| WO | 00/66380 A1 | 11/2000 |
| WO | 01/30606 A1 | 5/2001 |
| WO | 2005/023571 A | 3/2005 |
| WO | 2008/007286 A1 | 1/2008 |
| WO | 2008/064811 A1 | 6/2008 |
| WO | 2009/052807 A1 | 4/2009 |
| WO | 2010/009490 A1 | 1/2010 |
| WO | 2020/065283 A1 | 4/2020 |
| WO | 2020/065285 A1 | 4/2020 |
| WO | 2020/065286 A1 | 4/2020 |
| WO | 2020/065288 A1 | 4/2020 |

OTHER PUBLICATIONS

International Search Report and Written Opinion mailed Dec. 12, 2019, directed to International Application No. DCT/GB2019/052672; 12 pages.

Search Report dated Mar. 22, 2019, directed to GB Application No. 1815863.4; 1 page.

(56) References Cited

OTHER PUBLICATIONS

International Search Report and Written Opinion mailed Dec. 16, 2019, directed to International Application No. PCT/GB2019/052675; 12 pages.
Search Report dated Mar. 14, 2019, directed to GB Application No. 1815862.6; 1 page.
Office Action received for Chinese Patent Application No. 201980061371.1, mailed on Jul. 25, 2023, 17 pages (9 pages of English Translation and 8 pages of Original Document).
Office Action received for Chinese Patent Application No. 201980061328.5, mailed on Aug. 14, 2023, 15 pages (8 pages of English Translation and 7 pages of Original Document).
International Search Report and Written Opinion received for PCT Patent Application No. PCT/GB2019/052671, mailed on Dec. 12, 2019, 11 pages.
International Search Report and Written Opinion received for PCT Patent Application No. PCT/GB2019/052672, mailed on Dec. 12, 2019, 12 pages.
International Search Report and Written Opinion received for PCT Patent Application No. PCT/GB2019/052673, mailed on Dec. 16, 2019, 12 pages.
International Search Report and Written Opinion received for PCT Patent Application No. PCT/GB2019/052674, mailed on Dec. 12, 2019, 12 pages.
International Search Report and Written Opinion received for PCT Patent Application No. PCT/GB2019/052675, mailed on Dec. 16, 2019, 12 pages.
International Search Report and Written Opinion received for PCT Patent Application No. PCT/GB2019/052676, mailed on Dec. 16, 2019, 12 pages.
JPH03224818A mt (Year: 1991).

\* cited by examiner

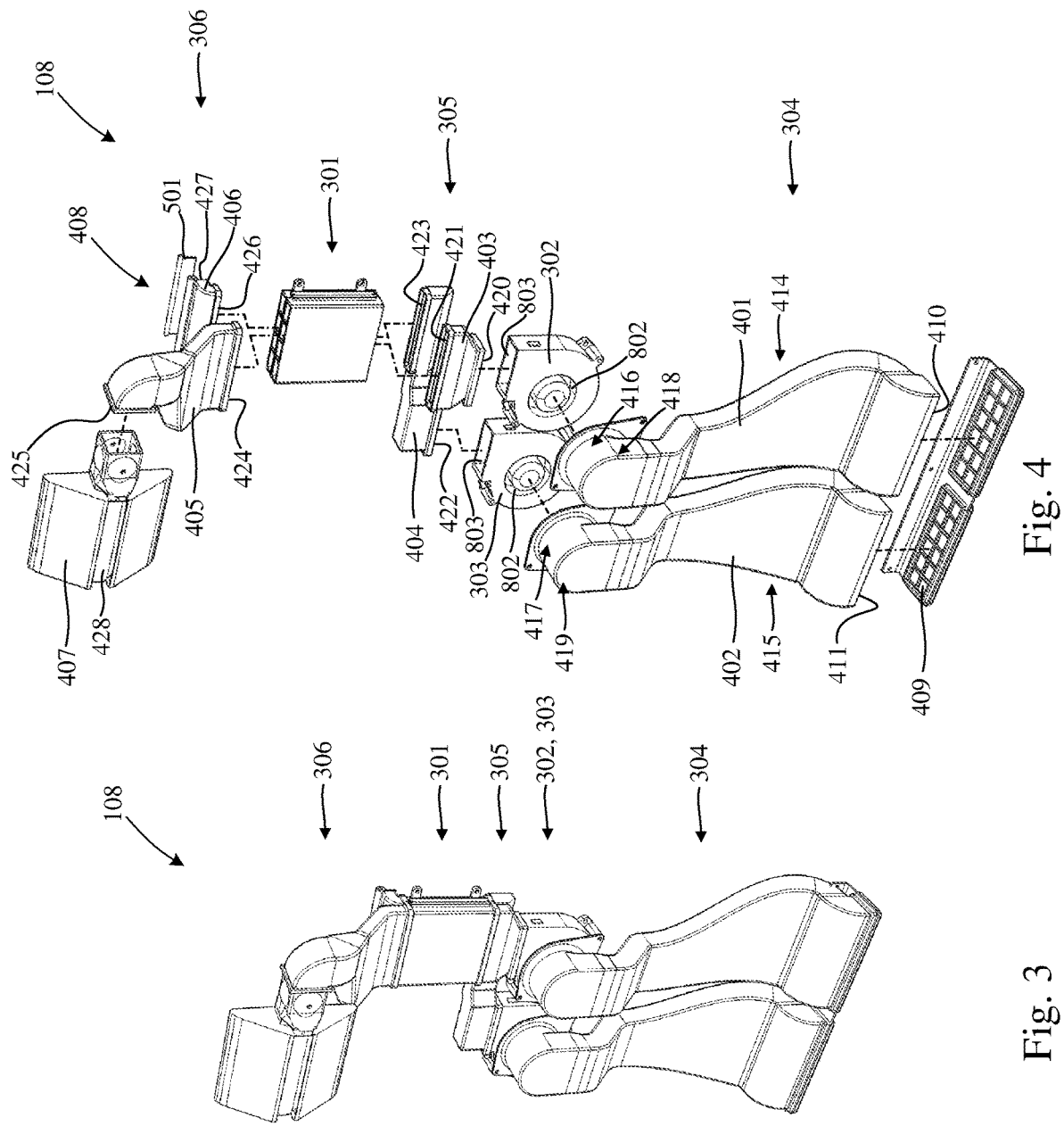

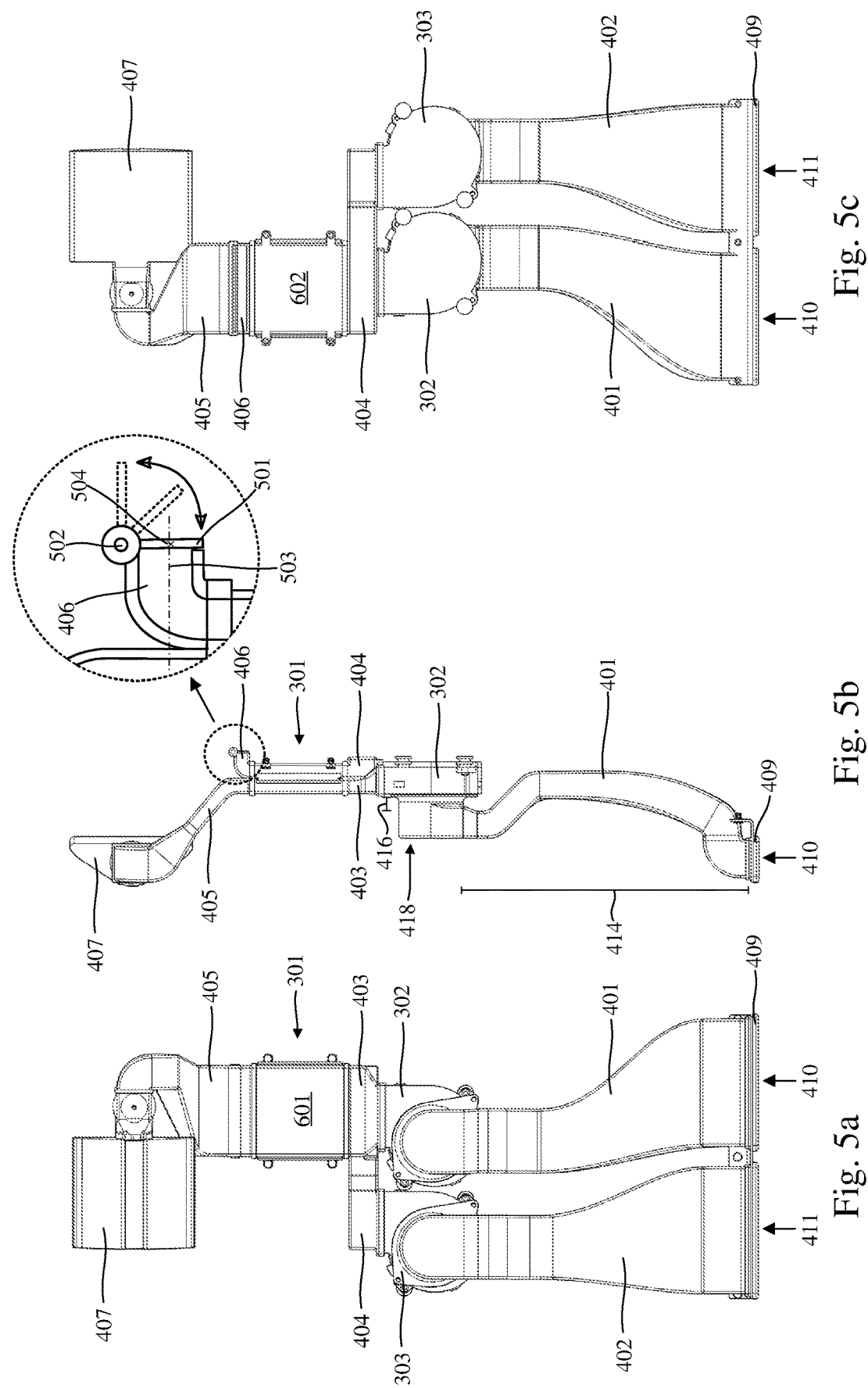

VEHICLE AIR CONDITIONING

REFERENCE TO RELATED APPLICATIONS

This application is a national stage application under 35 USC 371 of International Application No. PCT/GB2019/052675, filed Sep. 24, 2019, which claims the priority of United Kingdom Application No. 1815862.6, filed Sep. 28, 2018, the entire contents of each of which is incorporated herein by reference.

FIELD OF THE DISCLOSURE

The present invention relates to a vehicle with an air conditioning system for heating or cooling air supplied to the cabin of the vehicle.

BACKGROUND OF THE DISCLOSURE

Vehicles, such as passenger cars, often include an air conditioning system for heating, cooling or dehumidifying air supplied to the passenger cabin. Such systems typically comprise a heating element, a cooling element, and a motor driven fan to blow air over the heating/cooling elements into the passenger cabin. It is desirable to improve the performance and the noise-vibration-harshness (NVH) characteristics of vehicle air conditioning systems in order to improve cabin occupant comfort. For example, it is desirable to reduce the transmission of audible noise, heat energy, or vibrations from the air conditioning system to the passenger cabin. Furthermore, it is desirable to improve the energy efficiency of vehicle air conditioning systems to minimise the energy consumed by the system. Reducing the energy consumption of vehicle air conditioning systems is particularly important for battery electric vehicles (BEVs) to maximise the driving range of the vehicle.

SUMMARY OF THE DISCLOSURE

The present invention provides a vehicle comprising, a passenger cabin, and an air conditioning system comprising, a Peltier device, one or more blowers for directing a first airflow over a first side of the Peltier device and a second airflow over a second side of the Peltier device, wherein the first and second airflows are drawn from inside the passenger cabin, the first airflow is discharged into the passenger cabin and the second airflow is discharged outside of the passenger cabin.

In this specification the word 'blower' is intended to define a device capable of moving air. For example, each of the one or more blowers may comprise a movable component capable of moving air, for example, a bladed rotor such as an impeller, and a device for supplying motive force to the moving component, for example, a motor such as an electric motor for driving the rotor to rotate.

The Peltier device is operable as a heat pump to transfer heat energy between the first airflow directed over the first side and the second airflow directed over the second side. The first airflow may thus be heated or cooled by the Peltier device through exchange of thermal energy with the second airflow. The second airflow may reject thermal energy to the Peltier device in a heating mode of the air conditioning system or absorb thermal energy from the Peltier device in a cooling mode. The first airflow is discharged to the passenger compartment and may thus heat or cool the cabin environment. The second airflow on the other hand is discharged outside the passenger cabin. Thus 'waste' thermal energy carried by the second airflow is removed from the passenger cabin. As a result net heating or cooling of the passenger cabin may be achieved.

The one or more blowers may draw the first and second airflows from inside the passenger cabin. Drawing the first and second airflows from inside the passenger cabin is advantageous because, in certain operating conditions, the air within the passenger cabin may be closer in temperature to the desired cabin air temperature than air outside the passenger cabin. For example, in a hot climate where the air conditioning system is used for cooling the cabin, the air within the passenger cabin may be cooler than air outside the passenger cabin. Thus, drawing the first airflow from the passenger cabin reduces the amount of work that the Peltier device is required to do on the first airflow to maintain a desired cabin air temperature. Consequently the energy efficiency of the air conditioning system may be improved. Further, in such conditions, drawing the second airflow from the cooler air of the passenger cabin has the result that a given quantity of the second airflow may be capable of absorbing a greater quantity of heat energy from the second side of the Peltier device than relatively warmer atmospheric air. As a result the same degree of cooling of the second side of the Peltier device, that is the quantity of heat absorbed from the second side by the second airflow, may be achieved by a second airflow with a lower flow rate. This has the first advantage that less power will be consumed by the one or more blowers generating the second airflow, and secondly may result in a quieter second airflow.

Further, the temperature of air inside the passenger cabin is likely to be more stable than that of atmospheric air outside the passenger cabin. Unstable influent air temperatures may complicate control of the temperature of the Peltier device and so of the temperature of the airflow discharged to the passenger cabin. Conversely, drawing either or both of the first and second airflows from the passenger cabin may simplify temperature control of the air conditioning system. Further, air within the passenger cabin may be cleaner and/or less humid than atmospheric air. This may be the case particularly where influent airflow to the passenger cabin is filtered before admission to the passenger cabin. Consequently the components of the air conditioning system, for example, the Peltier device and/or the blower are less susceptible to damage resulting from exposure to the air. Further, air within the passenger cabin is likely to be less turbulent than air outside the passenger cabin. A turbulent influent airflow to the air conditioning system could result in buffeting of the airflow, which could tend to damage the blower and/or result in blower 'chatter' producing audible noise. Thus, drawing either or both of the first and second airflows from inside the passenger cabin may reduce the level of audible noise generated by the blower(s) and protect the blower(s) from damage.

At least one, and preferably both, of the first and second airflows may be drawn from a footwell of the passenger cabin. Air in a footwell region of the passenger cabin may tend to be cooler than air in higher regions of the passenger cabin. As previously noted, providing the air conditioning system with relatively cool air may, in certain operating conditions, improve the performance and/or the energy efficiency of the air conditioning system. Furthermore, by drawing the airflows from a footwell of the passenger cabin, a passenger cabin occupant will be less likely to perceive the influent airflows than if the airflows were drawn from a higher region of the cabin. Consequently the perceived refinement of the air conditioning system is improved.

The one or more blowers may draw at least one of the first and second airflows from inside the passenger cabin through a duct having an inlet open to the passenger cabin, and the duct may be arranged with the inlet located on a downwardly facing surface of the vehicle. By locating the inlet on a downwardly facing surface of the vehicle, air will tend to be drawn in an upward direction through the inlet. This has the advantage that debris and particulates will be less likely to become entrained in the influent airflow and thus the level of contaminants in the influent airflow may be reduced. As a result the airflow through the air conditioning system may be cleaner, which may reduce damage to the Peltier device and the one or more blowers. Optionally, where one of the first and second airflows is drawn from a footwell of the passenger cabin, it may be particularly desirable for that airflow to be drawn through a duct having an inlet located on a downwardly facing surface of the vehicle in the footwell.

The air conditioning system may comprise one or more filters located upstream of the blowers for filtering the first and second airflows. Consequently the air supplied to the one or more blowers may be cleaner, thereby further reducing the likelihood of damage being caused to the blowers.

The vehicle may comprise a door to the passenger cabin, and the inlet may be located on an underside of the door. Locating the inlet on the underside of the door has the first advantage that airflow is drawn from a region at a lower end of the door. Air in the lower region of the door may be relatively cooler than air in higher regions of the vehicle. Consequently, the Peltier device may be supplied with a relatively cool air flow. As previously noted, providing the air conditioning system with relatively cool air may, in certain operating conditions, improve the performance and/or the energy efficiency of the air conditioning system. Further, the inlet may be aesthetically unsightly, and locating the inlet on the underside of the door may mean that the inlet is hidden from the normal view of a passenger cabin occupant. Further, locating the inlet on the underside of the door has the advantage that liquids, for example, water condensate, incident on vertical sides of the door will be less likely to run down the sides and inwardly through the inlet into the air conditioning system.

The inlet may overlie a sill of the vehicle when the door is in a closed position. In other words, the inlet may be located so as to open against the sill when the door is closed. For example, the inlet may overlie a sill extending along a lower edge of a door opening closed by the door. This arrangement has the advantage that the vent aperture is shielded by the sill. Consequently, turbulence at the inlet may be reduced. As a result airflow through the inlet and to the blower is likely to be smoother and less turbulent. This may advantageously result in a quieter airflow through the inlet into the air conditioning system, and additionally reduce the turbulence of the airflow supplied to the blower. Further, in this arrangement the sill may advantageously attenuate audible noise emitted from the duct, for example, audible noise emanating from the one or more blowers. Further, this arrangement may desirably hide the inlet from the normal view of a passenger cabin occupant.

At least one of the Peltier device and the one or more blowers may be mounted to the door. Where the one or more blowers draw air through an inlet located on an underside of the door, it is advantageous to mount at least one of the Peltier device and the one or more blowers, and preferably each of the Peltier device and the blowers, to the door in such that the distance the airflows must be ducted between the inlet and the Peltier device and/or the is reduced. Consequently, the length, and so mass, and complexity of ducting for ducting the airflows to the blowers may be reduced. In particular, mounting the Peltier device and/or the blowers to the door avoids the need to duct the airflows between a main structure of the vehicle and the relatively movable door. This simplifies the ducting, and moreover has the result that the airflow between the inlet and the Peltier device and/or the blowers is not interrupted when the door is opened.

The one or more blowers may comprise a first blower for directing a first airflow over a first side of the Peltier device and a second blower for directing the second airflow over a second side of the Peltier device.

The reference in this specification to first and second blowers is to first and second devices that are independently operable. That is to say, to blowers which have a construction that permits each blower to be operated independently of the other blower. For example, each of the blowers may comprise a rotor capable of moving air and an electric motor for driving the rotor to rotate. This is compared, for example, to a blower comprising multiple rotors rigidly mounted to a shaft of a common motor, where the operation of the two rotors are linked.

Employing first and second blowers to generate the first and second airflows has the first advantage that the rate of flow of the first and second airflows may be set differently. This is advantageous where it is desirable for the rate of flow of the first airflow to be greater or lesser than the rate of flow of the second airflow. For example, where the air conditioning system is being used to cool the passenger cabin, a relatively high rate of airflow over the second side of the Peltier device may be required in order to remove the required amount of heat energy. This may be the case particularly in a warm climate, where the capacity of the second airflow for absorbing heat energy may be relatively low. It may be desirable however that the first airflow is set to a relatively lower rate, firstly to increase the dwell time of the first airflow with the first side of the Peltier device and so improve thermal transfer therebetween, and secondly to reduce perception of the airflow by cabin occupants, thereby improving occupant comfort.

Further, using first and second blowers that are independently operable allows the rate of flow of the first airflow to be varied independently of the rate of the flow of the second airflow. As a result, the rate of flow of either of the first and second airflows may be varied without also changing the flowrate of the other airflow. This may be advantageous where it is desirable to increase or decrease one of the first and second airflows whilst maintaining the rate of flow of the other airflow constant.

Further, the first and second blowers allow a given total volumetric flow rate over the first and second sides of the Peltier device to be achieved using two relatively small blowers instead of a single larger blower. Smaller blowers may advantageously be easier to 'package' within a vehicle.

The air conditioning system may comprise a controller for controlling independently the first and second blowers. For example, the controller may be capable of turning each of the blowers on and off independently of the other blower. Further, the controller may be functional to control the speed of the first blower independently of the speed of the second blower. This arrangement advantageously allows the speed of the first blower, and so the flow rate of the first airflow, to be varied independently of the speed of the second blower, and so of the flow rate of the second airflow. Independent control of the first and second blowers may thus improve the performance and/or the refinement of the air conditioning system.

The first blower may draw the first airflow from inside the passenger cabin through a first duct having an inlet open to the passenger cabin, and the second blower may draw the second airflow from inside the passenger cabin through a second duct having an inlet open to the passenger cabin. In other words, the first and second blowers draw the first and second airflows from inside the passenger cabin through separate ducts. This arrangement has the advantage that, because the first and second airflows do not mix in the ducts, turbulence in the influent airflows is reduced. In comparison, where the first and second airflows are drawn through a single duct, the interaction of the airflows in the ducts results in turbulence. In particular, turbulence may be generated in a common inlet air duct where the flow rates of the first and second airflows are different. Turbulence in the inlet ducts to the blowers could result in blower 'chatter', and so generation of audible noise or even damage to the blowers. Thus, this arrangement advantageously reduces turbulence and the associated negative effects on the blowers.

The inlet of the first duct may be located adjacent the inlet of the second duct. In other words, the inlets of the duct may be arranged in close proximity. For example, the inlet of the first duct may be located immediately beside the inlet of the second duct. Alternatively, the inlet of the first duct could be spaced from the inlet of the second duct by a relatively small distance, for example, by a distance of less than 20 centimetres, preferably less than 10 centimetres, more preferably less than 5 centimetres. As a further alternative, the inlets of the first and second ducts could be spaced by a distance that is no greater than a maximum diameter dimension of the inlet of either duct.

Locating the inlets adjacently has the result that the first and second airflows are drawn from the same region of the passenger cabin. This tends to result in a lower pressure region in the vicinity of the inlets, and consequently establishes a movement of air within the passenger cabin towards the lower pressure region and the inlets of the ducts. This movement of air towards the inlets is advantageous firstly for mixing air inside the passenger cabin, thereby improving the temperature uniformity of the cabin environment and reducing localised hot or cold regions. Further, the flow of air within the passenger cabin towards the inlets of the ducts tends to result in a less turbulent influent airflow through each inlet. This effect has been observed to be most pronounced where the inlets are immediately adjacent or closely spaced, in particular, where the inlets are separated by a distance of less than 10 centimetres. Furthermore, because the ducts draw air from the same region of the passenger cabin, the temperature and/or density of the influent air flows will tend to be similar. Supplying the first and second blowers with air having approximately the same temperature and density has the advantage that audible noise generated by the airflows will tend to be in the same frequency range.

The vehicle may comprise a door to the passenger cabin, the door comprising a compartment, and the second airflow may be discharged into the compartment. Discharging the second airflow directly to atmosphere has the disadvantage that atmospheric turbulence and pressure variation induced as the vehicle travels at speed may result in undesirable aerodynamic effects on the second airflow as it passes across the one or more blowers or the Peltier device. For example, atmospheric turbulence may result in buffeting of the second airflow, which could cause damage to the one or more blowers and/or result in blower 'chatter' producing audible noise. In comparison, walls of the door at least partly enclose the compartment, thus restricting air exchange between the compartment and atmosphere. Consequently, speed induced aerodynamic effects such as air turbulence may be relatively lesser in the compartment than in the atmosphere surrounding the vehicle. As a result, the second airflow may be less negatively affected by undesirable aerodynamic effects when discharged into the compartment.

The compartment may comprise a vent for discharging the second airflow from the compartment to atmosphere. In other words, the compartment may be vented to atmosphere via a vent. This arrangement has the advantage that air can be discharged from the compartment to atmosphere. Consequently, a sustained flow of air may be established from the air conditioning system through the compartment of the door to atmosphere. In other words, venting the compartment to atmosphere allows the second airflow to be discharged to atmosphere through the compartment. Preferably the vent may be relatively small in size in order to reduce backflow of air through the vent from the atmosphere into the compartment is relatively low. This arrangement has the advantage that turbulent atmospheric air is inhibited from entering the compartment. As a result turbulence within the compartment is minimised. Preferably the vent aperture has a maximum diameter dimension of less than 2 centimetre (cm), preferably less than 1.5 cm, more preferably no greater than 1 cm. Preferably the cross-sectional area of the vent aperture is less than 4 square centimetres ($cm^2$), preferably less than 2.5 $cm^2$, more preferably no greater than 1 $cm^2$. The compartment may comprise a plurality of such vents for discharging the second airflow to atmosphere. Preferably the aggregate total cross-sectional area of the plurality of vents is less than 8 $cm^2$, preferably less than 5 $cm^2$, more preferably no more than 2 $cm^2$. Vent sizes and areas of this order have been found to advantageously minimise ingress of air to the compartment through the vent(s) whilst still acceptably permitting discharge of air from the compartment to atmosphere.

The vent may be located at a lower end of the compartment. Preferably the vent is located at a lowermost extent of the compartment. Locating the vent at a lower end of the compartment has the advantage that water or other liquids within the compartment, for example, water condensate from the second airflow, will tend to drain from the compartment under gravity through the vent aperture. As a result accumulation of water within the compartment, which might result, for example, in corrosion to the door structure, is avoided. The vent aperture may thus serve two purposes: firstly for venting air from the compartment to atmosphere, and secondly for draining water or other liquids from the compartment. This may avoid the need for separate water drain apertures. The vent aperture should ideally be located as close to the lowest point of the compartment as possible to avoid as far as practicable liquid retention in the compartment. It is particularly desirable that the vent is located at a lowermost extent of the compartment such that substantially the whole volume of the compartment is higher than the vent. This arrangement has the advantage that all liquids within the compartment will tend to drain from the compartment through the vent.

The compartment may be sealed from the passenger cabin. For example, the compartment may be sealed from the passenger cabin by a wall of the door dividing the compartment from the passenger cabin. This arrangement has the advantage that air within the compartment is prevented from leaking into the passenger cabin. Consequently the passenger cabin environment is not contaminated by air, which may contain waste heat carried by the second airflow, from within the compartment. As a result the energy input required to maintain a desired air temperature in the passenger cabin may be reduced. The seal between the compartment and the passenger cabin should ideally be substantially air-tight to reduce as far as practicable leakage of air from the compartment of the door to the passenger cabin.

Although it may be desirable that the compartment is sealed from the passenger cabin so as to substantially prevent passage of air therebetween, it is feasible that the air conditioning system could usefully operate even without the compartment being sealed from the passenger cabin. For example, a wall of the door may extend between the compartment and the passenger cabin so as to inhibit but not prevent completely passage of air from the compartment to the passenger cabin. Such an arrangement is feasible in particular where the compartment is vented to atmosphere, because as long as the restriction to airflow from the compartment to atmosphere is less than the restriction to airflow from the compartment to the passenger cabin, air will tend to discharge from the compartment to atmosphere in preference to the passenger cabin. Thus, in this scenario, even where the compartment is not sealed from the passenger cabin, leakage of air from the compartment to the passenger cabin may be sufficiently low as to present only a minor detriment. Nevertheless, for the reasons noted above, in many applications it will be desirable that the compartment is sealed from the passenger cabin, preferably by a substantially air-tight seal, to at least inhibit, and preferably substantially prevent, leakage of air from the compartment to the passenger cabin.

BRIEF DESCRIPTION OF THE FIGURES

In order that the present invention may be more readily understood, embodiments of the invention will now be described, by way of example, with reference to the accompanying drawings, in which:

FIG. 3 is a perspective view of the air conditioning system;

FIG. 4 is an exploded perspective view of the air conditioning system;

FIGS. 5a, 5b and 5c are front, side and rear elevation views respectively of the air conditioning system;

DETAILED DESCRIPTION OF THE DISCLOSURE

Figure 1:
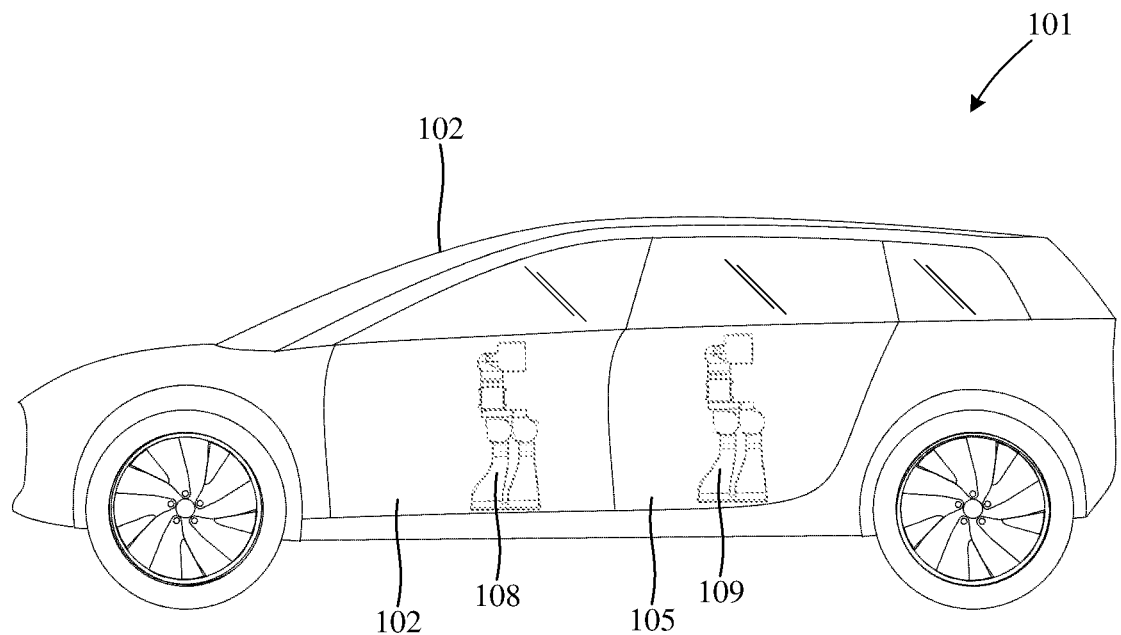
FIGS. 1 and 2 are illustrative views of a vehicle comprising an air conditioning system embodying the invention.
Figure 2:
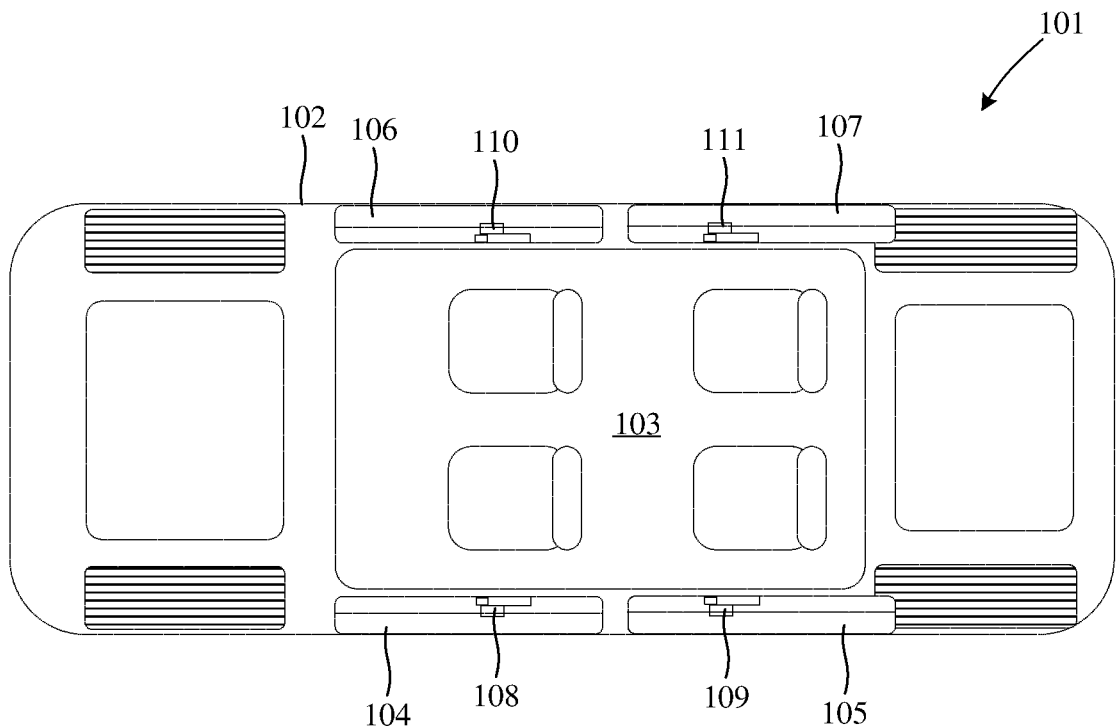
Figure 6:
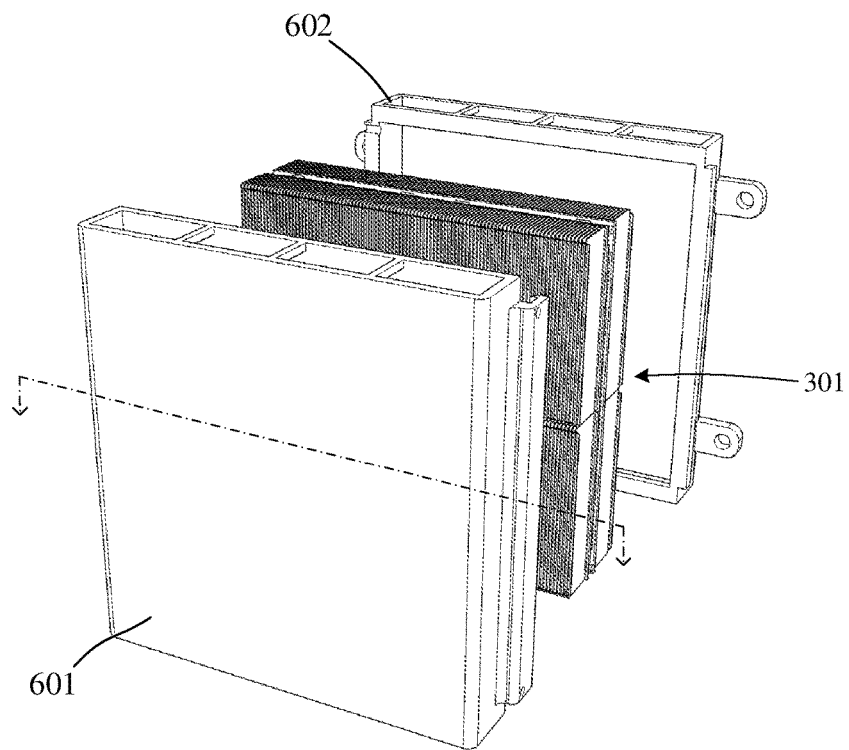
FIG. 6 is an exploded perspective view of a Peltier device of the air conditioning system.
Figure 7:
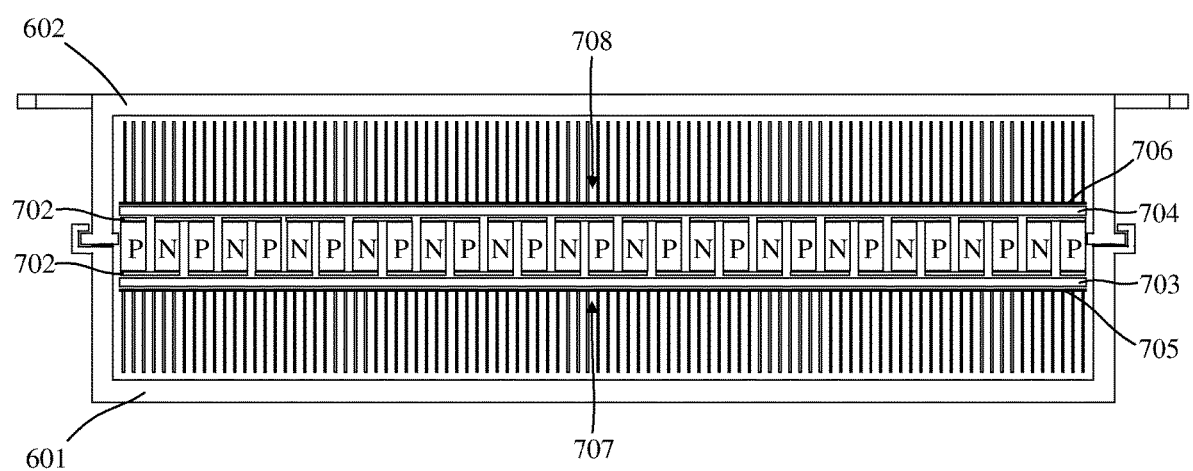
FIG. 7 is an illustrative view of a section through the Peltier device along the line A-A depicted in FIG. 6.

Referring firstly to FIGS. 1 and 2, a vehicle, which in the example takes the form of a passenger car 101, comprises a body structure 102 defining a passenger cabin 103 for accommodating passengers, door openings in the side of the body structure 102 to permit passenger ingress and egress from the cabin 103, and a plurality of doors 104, 105, 106, 107, hingedly connected to the body structure 102 adjacent a respective door opening to selectively close the door opening.

The car 101 further comprises a plurality of air conditioning systems, 108, 109, 110, 111, for heating or cooling air supplied to the passenger cabin 103. Each of the air conditioning systems 108 to 111 is mounted to a respective door 104 to 107 and includes an inlet and an outlet open to the passenger cabin 103. In the way that will be described further with reference to FIG. 10, each of the air conditioning systems 108 to 111 is operable to draw air from the passenger cabin 103, selectively heat or cool the air, and discharge the heated or cooled airflow back to the passenger cabin to thereby heat or cool the cabin environment.

Each air conditioning system 108 to 111 is substantially identical, as is the mounting of each air conditioning system to a respective door. For brevity therefore only air conditioning system 108 and door 104 will be described in detail herein, on the understanding that the same teachings are applicable to air conditioning systems 109 to 111 and doors 105 to 107.

Referring next to FIGS. 3 to 9, the air conditioning system 108 comprises principally a Peltier device 301, first and second blowers 302, 303, three stages of ducting, indicated generally at 304, 305, and 306, and an electronic controller 901 for controlling the operation of the Peltier device 301 and the blowers 302, 303.

The Peltier device 301 is arranged within a housing comprising front and rear parts 601, 602 enclosing first and second sides respectively of the Peltier device 301.

The Peltier device 301 comprises an array 701 of n-type and p-type semiconductors, electrically conductive copper plates 702, thermally conductive and electrically insulating ceramic plates 703, 704, and finned aluminium heatsinks 705, 706. The semiconductors are arranged in a square array 701 of n- and p-type semiconductor pairs which are electrically coupled in series by the copper plates 702. The semiconductor array 701 is sandwiched between the ceramic plates 703, 704, which have their inner surfaces thermally coupled to opposing ends of the semiconductors in the array, and which thereby define first and second sides 707, 708 respectively of the Peltier device 301. Finned aluminium heat sinks 705, 706 are provided in thermal contact with the outer surfaces of the ceramic plates 704, 705 respectively.

The front and rear parts 601, 602 of the housing form ducts for guiding airflows over the first and second sides 707, 708 respectively of the Peltier device 301. Thus, the front part 601 defines with the ceramic plate 703 a first duct over the first side 707 of the Peltier device 301, and the rear part 602 defines, with the ceramic plate 704 a second duct over the second side 708 of the Peltier device 301. As shown best in FIG. 7, the aluminium heat sinks 705, 706 are arranged with their fins extending longitudinally the height of the Peltier device and laterally across each duct. Thus, the fins of each heatsink 705, 706 define a plurality of narrow longitudinally extending channels through each duct. Airflows through each duct flow through the narrow channels in contact with the fins of the heatsink, thus ensuring good thermal transfer between the airflows and the first and second sides 707, 708 of the Peltier device 301 respectively.

When a direct current is applied across the semiconductor pairs, electrons flowing between the dissimilar materials transition between energy states, absorbing or releasing thermal energy at the junction in dependence on the direction of current flow. Electrons moving in a direction from the n-type material to the p-type material, jump to a higher energy state and absorb thermal energy at the junction from the ceramic plate 703, thereby cooling the ceramic plate 703. As the electrons move from the p-type material to the n-type material of an adjacent pair, the electrons revert to a lower energy state, releasing thermal energy to, and so heating, the ceramic plate 704. Thus, in this mode of operation the Peltier device may be used to cool a first airflow flowing over the first side 707 of the Peltier device by rejecting heat to a second airflow flowing over the second side 708. Conversely, when the polarity of the electric current is reversed, electrons flowing in a direction from the p-type material to the n-type material reject heat to the ceramic plate 703 and absorb heat from the ceramic plate 704. In this mode of operation the Peltier device may thus be used to heat the first airflow passing over the first side 707 by absorbing thermal energy from the second airflow flowing over the second side 708 of the Peltier device.

Figure 8A:
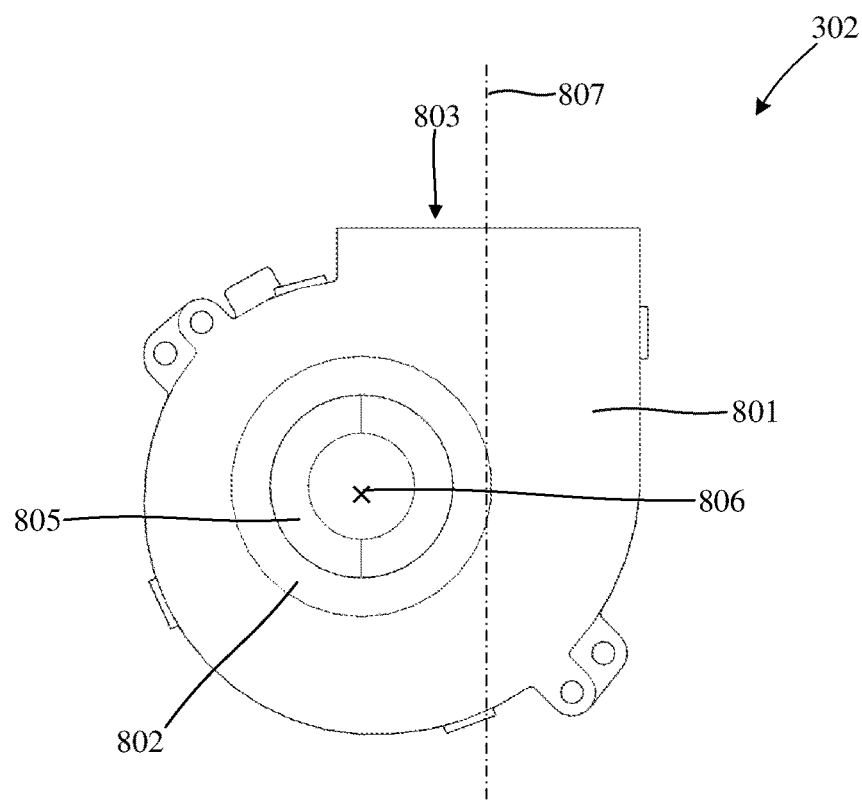
FIGS. 8a and 8b are front and side elevation views respectively of a blower of the air conditioning system.
Figure 8B:
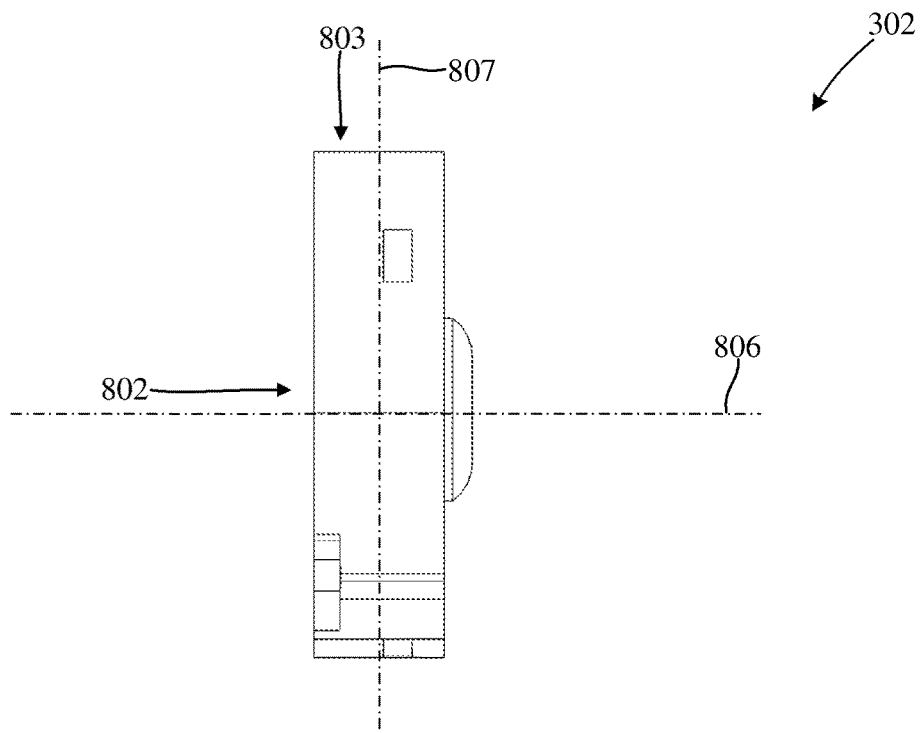

Referring particularly to FIGS. 8a and 8b, the blowers 302, 303 are substantially identical, and generally conventional, in construction. Each blower is a centrifugal 'squirrel-cage' type blower, comprising a housing 801 having an inlet 802 and an outlet 803, an electric motor 804, and an impeller 805 mounted on a shaft of the motor for rotation within the housing 801 about an axis of rotation 806. Rotation of the impeller 805 about the axis 806 draws an airflow into the housing 810 through the inlet 802 in an axial direction, i.e. a direction parallel to the axis of rotation 806 of the impeller 805. The airflow is accelerated centrifugally by the turn of the impeller 805, and then discharged from the housing 801 in a radial direction along the axis 807 extending radially relative to the axis of rotation 806, through the outlet 803.

The first stage of ducting 304 comprises first and second ducts 401, 402 for ducting first and second airflows to the first and second blowers 302, 303 respectively. Each of the ducts 401, 402 comprises an inlet 410, 411 at one end and an outlet 412, 413 at the other end. A particle filter assembly 409 is arranged over the inlets 410, 411 to filter air drawn into the ducts. The ducts 401, 402 are substantially identical in form and each comprise a long first section 414, 415 leading from the inlet 410, 411, and a relatively shorter second section 416, 417 leading from the first section 414, 415 to the outlet 412, 413. The second section 416, 417 extends generally orthogonally relative to the first section 414, 415 thus forming a bend 418, 419 where the axis of the duct turns. In the illustrated assembled state the first section 414, 415 of each duct 401, 402 extends in a generally radial direction relative to the axis of rotation 806 of the blowers 302, 303, between the inlet 410, 411 of each duct and the second section 416, 417, and the second section 416, 417 extends in a generally axial direction relative to the axis of rotation 806, from the first section 414, 415 to the outlet 412, 413. Air flowing through each of the ducts 401, 402 thus undergoes a turn through the bend 418, 419 from the generally radial direction to the generally axial direction. The outlet 412 of the first duct 401 is joined to the inlet 802 of the first blower 302, and the outlet 413 of the second duct 402 is joined to the inlet 802 of the second blower 303.

The second stage of ducting 305 comprises third and fourth ducts 403, 404 for ducting airflows between the blowers 302, 303 and the Peltier device 301. The third duct 403 is arranged for ducting a first airflow from the outlet 803 of the first blower 302 to the first side 707 of the Peltier device, and comprises an inlet 420 mated to the outlet 803 of the first blower 302 and an outlet 421 mated to the first part 601 of the housing. The third duct 403 is generally straight and defines a generally linear passage extending between the inlet 420 and the outlet 421. The fourth duct 404 is arranged for ducting a second airflow from the second blower 303 to the second side 708 of the Peltier device 301, and comprises an inlet 422 mated to the outlet 803 of the second blower 303 and an outlet 423 mated to the second part 602 of the housing. The fourth duct 404 is generally 'S' shaped, and defines a convoluted passage between the inlet 422 and the outlet 423.

Referring particularly to the side view of FIG. 5b, In the assembled state the first and second blowers 302, 303 are arranged in substantially the same plane with their inlet axes 806 and outlet axes 807 extending perpendicular and parallel to the plane respectively. The first blower 302 is mounted in approximate lateral alignment with a longitudinal centreline of the Peltier device 301 such that the outlet axis 807 of the first blower 302 projects across the Peltier device 301 over the first side 707. In this arrangement a first airflow from the first blower 302 may ducted by the third duct 403 along a generally linear path from the blower 302 to the first side 707 of the Peltier device 301. The second blower 302 is arranged with the axis 807 laterally offset from the Peltier device 301. The fourth duct 404 is arranged to duct an airflow from the outlet 803 of the second blower 303 to the second side 708 of the Peltier device 301 behind the third duct 403.

The third stage of ducting 306 comprises fifth and sixth ducts 405, 406 for ducting the first and second airflows from the first and second sides 707, 708 of the Peltier device 301 to first and second outlets of the air conditioning system. The fifth duct 405 is arranged for ducting the first airflow from the first side 707 of the Peltier device 301. An inlet 424 of the fifth duct 405 is joined to the first part 601 of the housing of the Peltier device 301 for receiving a first airflow passed over the first side 707 of the Peltier device 301. A vent assembly 407 comprising an outlet opening 428 is coupled to an outlet 425 of the fifth duct 405 for selectively shaping and throttling the first airflow. An inlet 426 of the sixth duct 406 is joined to the second part 602 of the housing of the Peltier device 301 for receiving a second airflow passed over the second side 708 of the Peltier device 301. An outlet 427 of the sixth duct 406 is fitted with a valve assembly 408 for opening and closing the duct 406.

Referring again in particular to FIG. 5b, the valve assembly 408 is operable to open and close the outlet 427 of the sixth duct 406 to control the flow of air through the duct 406. In the example, the valve is configured as a one-way valve to open when acted on by the second airflow flowing through the duct 406 in a direction from the inlet 426 to the outlet 427, and to actuate automatically to a closed condition when not acted on the by the second airflow through the duct, to thereby inhibit reverse airflow through the duct 406. The valve assembly comprises a hingedly carried valve flap 501 that is rotatable between the open and closed positions shown in the Figure about the axis of rotation 502. In the open position the valve flap 501 extends generally parallel to the axis 503 of the sixth duct 406 at the outlet, thereby presenting a minimal restriction to an airflow along the duct. In the closed position the valve flap 501 depends downwardly from the axis 502, generally orthogonally to the duct axis 503, thereby occluding the outlet 427 of the duct 406 to inhibit airflow through the duct.

As shown in the Figure, the axis 502 about which the flap 501 rotates is arranged to extend at a height higher than the centre of gravity 504 of the flap in the closed position. Consequently the flap 501 is biased to the closed, downwardly depending, position by the force of gravity acting on the flap. In the example, the flap 501 is adapted to have a relatively low mass. This has the advantage that only a relatively low force is required to be exerted on the flap to move the flap from the closed position to the open position. As a result the valve flap will tend to be moved from the closed position to the open position, against the biasing force of gravity acting on the flap, automatically when acted on by the second airflow without presenting an excessive restriction to the second airflow along the duct. Conversely, when the second airflow through the duct is ceased, or indeed if reverse flow conditions were to develop, the valve flap 501 will tend to default under the force of gravity to the closed position, thereby preventing backflow through the duct 406.

Alternatively or additionally, the valve assembly 408 could be provided with a separate biasing member, for example, a spring, connected between the flap 501 and the duct 406 for biasing the flap to the closed position. In such an alternative configuration it may be advantageous for the spring to exert only a relatively low restorative force on the valve flap, such that only a relatively low force is required to be exerted on the flap by the second airflow to actuate the flap to the open position. As a further exemplary alternative, the valve assembly 408 could be provided with a controllable motor for actuating the flap between the open and closed positions. A motor controlled flap may advantageously allow more precise control of the state of the valve, however may disadvantageously increase the complexity of the construction and operation of the valve.

Figure 9:
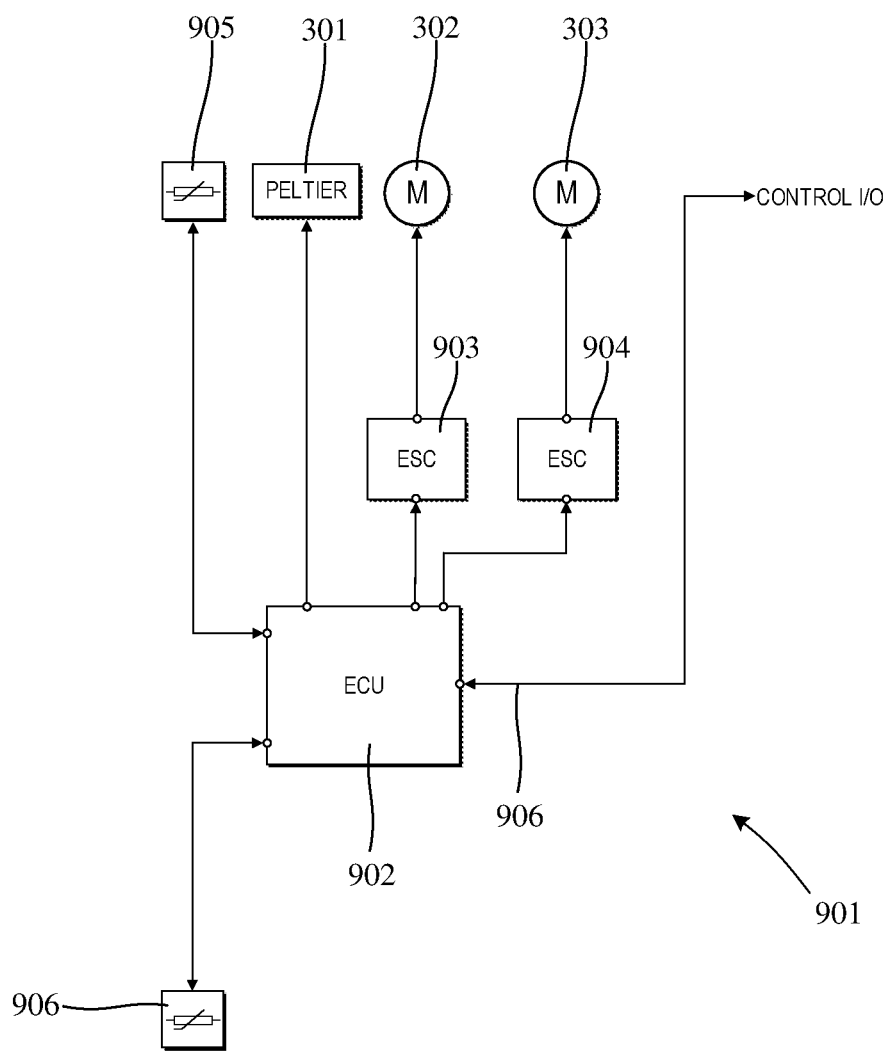
FIG. 9 is a schematic representation of a controller for controlling the operation of the air conditioning system.

Referring next particularly to FIG. 9, the air conditioning system 108 comprises an electronic controller 901 for controlling the operation of the first and second blowers 303, 303 and of the Peltier device 301. In the example, the electronic controller 108 comprises an electronic control unit (ECU) 902, first and second electronic speed controllers (ESC) 903, 904, and first and second temperature sensors 905, 906.

The ECU 902 comprises a number of inputs and outputs, including input/output 906 for interfacing with other electronic circuitry of the vehicle, for example, with a HMI (human-machine interface) of the vehicle. Each of the electronic speed controllers 903, 904, the Peltier device 301, and the temperature sensors 905, 906 are connected to and under the common control of the ECU 902. The ECU 902 is functional to control independently the first and second ESCs 903, 904, and to control the magnitude and polarity of an electric current supplied to the Peltier device 301.

The first and second ESCs 903, 904 are connected to the motors 804 of the first and second blowers 302, 303 respectively, and are functional to control electric currents supplied to each motor independently. Through control of the ESCs 903, 904 the ECU 902 is thus operable to control independently the blower speeds of each of the first and second blowers 302, 303 respectively.

In the example each of the temperature sensors 905, 906 are negative temperature coefficient thermistors which, as is known, have electrical resistance characteristics which increase proportionally as a function of the temperature of the device. The ECU 902 supplies an electrical current to each of the thermistors 905, 906 and by measuring the resistance of the thermistor may deduce the temperature of each device. The first thermistor 905 is arranged within the passenger cabin 103 of the vehicle exposed to air inside the passenger cabin. The second thermistor 906 is arranged on an exterior surface of the vehicle exposed to atmospheric air surrounding the vehicle. Thus, through the thermistors 905, 906 the ECU 902 may detect the temperature of air inside the passenger cabin 103 and of atmospheric air surrounding the vehicle.

In operation, the ECU 902 may receive a signal from an HMI interface indicating a desired passenger cabin air temperature. The ECU 902 is functional to detect the actual temperature of air inside the passenger cabin via the temperature sensor 905, and of air outside the passenger cabin via the temperature sensor 906, and to control the operation of the Peltier device 301 and the blowers 302, 303 in dependence on the measured temperatures. Thus, the controller 902 may control the power and polarity of the current supplied to the Peltier device 301 to control the temperature of the first side 709 of the Peltier device 301. Via the ESCs 903, 904, the controller may also control independently the speeds of each of the blowers 302, 303 to control the rate of flow of the first and second airflows over the first and second sides 708, 708 of the Peltier device 301.

Figure 10:
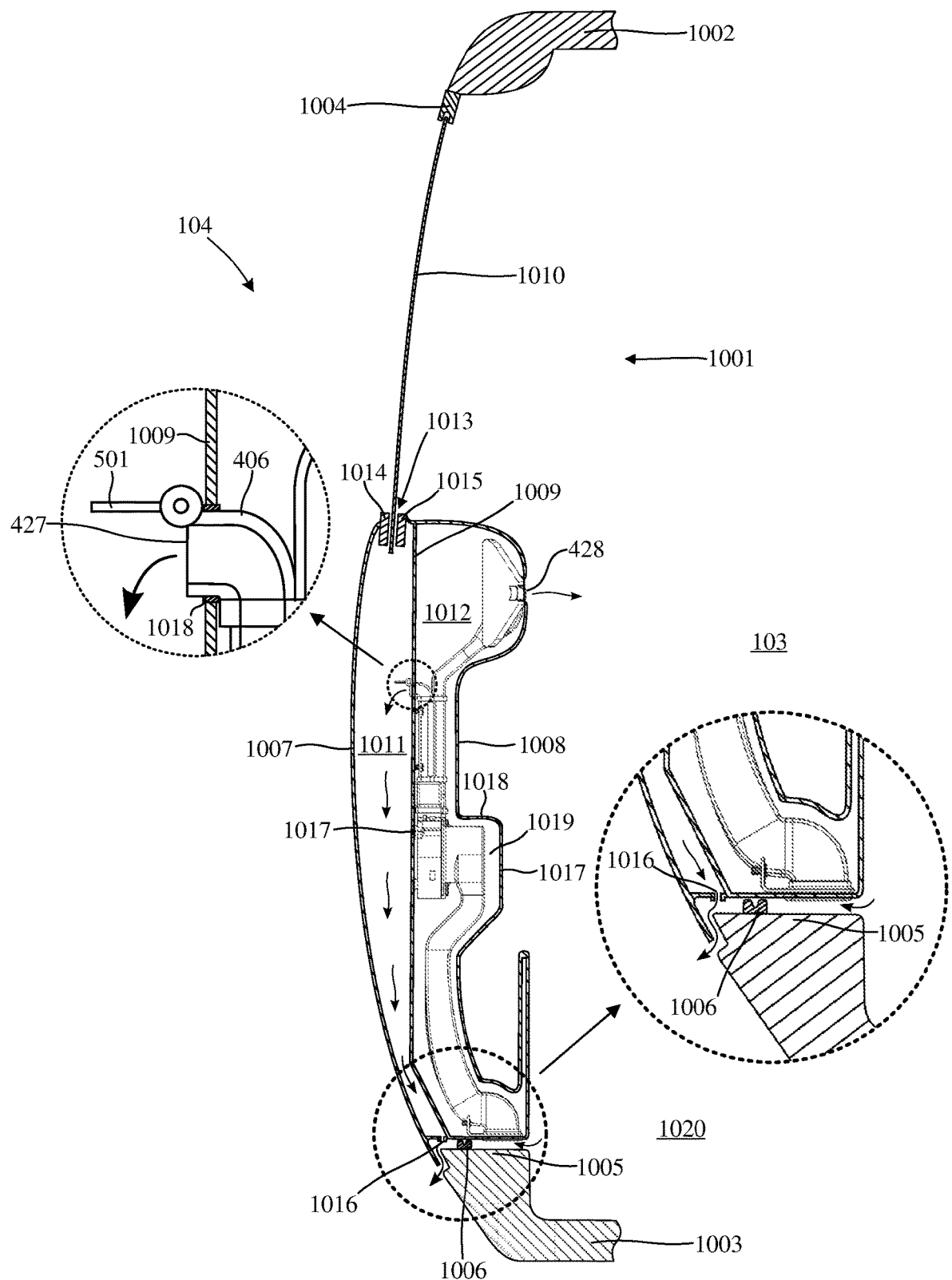
FIG. 10 is an illustrative view of a section through a door of the vehicle showing the air conditioning system mounted within the door.

Referring finally to FIG. 10, the door 102 is shown in the closed position in which the door 102 is received in the door opening 1001 thereby closing the door opening. The door opening 1001 is defined between roof and floor structures 1002, 1003 of the body structure 102 of the vehicle. In the illustrated closed position, an upper edge of the door is received in a frame 1004 mounted to the roof structure 1002. The floor structure 1003 defines a sill 1005 extending along a lower extent of the door opening 1001, and comprises an upwardly projecting seal 1006 extending along an upper surface of the sill 1005. In the closed position a lower surface of the door overlies the upper surface of the sill 1005 and is sealingly engaged by the seal 1005 forming a substantially airtight seal between the sill 1005 and the door 102, thereby sealing the passenger cabin 103 from atmospheric air surrounding the vehicle.

The door 102 comprises an outer wall 1007 forming an exterior surface of the vehicle, an inner wall 1008 forming an interior surface of the vehicle bounding the passenger cabin 103, and a partition wall 1009 located between the outer wall 1007 and the inner wall 1008. The door 102 further comprises a slidably carried window pane 1010 which is movable between open and closed positions. The partition wall 1009 divides the internal volume of the door in two. A first compartment 1011 is defined between the outer wall 1007 and the partition wall 1009, and a second compartment 1012 is defined between the partition wall 1009 and the inner wall 1008. The partition wall 1009 seals the second compartment 1012 from the first compartment 1011 to substantially prevent leakage of air from the first compartment 1011 to the second compartment 1012.

The first compartment 1011 of the door forms a well for receiving the window pane 1010 and comprises an opening 1013 at an upper end through which the window pane may be lowered and raised in and out of the compartment 1011, representing open and closed positions of the window pane respectively. Seal parts 1014, 1015 are arranged along edges of the opening 1013 to sealingly engage outer and inner surfaces respectively of the window pane 1010 to inhibit ingress of liquids, for example, rain water, into the compartment 1011 through the opening 1013. The first compartment 1011 comprises a vent aperture 1016 through a wall at a lowermost extent of the compartment. The first compartment 1011 may thus exchange air with atmosphere through the vent aperture 1016. Furthermore, the vent aperture 1016 permits draining of liquids, for example, rainwater, from within the first compartment to outside the vehicle.

The air conditioning system 108 is installed within the second compartment 1012. Consequently the air conditioning system 108 is sealed from the environment of the first compartment 1011 by the partition wall 1009. As a result the air conditioning system 108 is less susceptible to damage from exposure to air or liquids within the first compartment 1011. Furthermore, when located in the second compartment 1012, the air conditioning system 108 is thermally insulated from the external environment of the vehicle by the body of air within the first compartment 1011, which protects the air conditioning system from damage that might result from exposure to extremes of atmospheric temperature outside the vehicle. The air conditioning system 108 is mounted to the partition wall 1009 by a plurality of 'soft' fixings, such as rubber bobbin 1017. Soft mounting the air conditioning system to the partition wall 1009 advantageously reduces transmission of vibrations therebetween. This may advantageously reduce noise resulting from transmission of vibrations generated by the air conditioning system to the door 102, and conversely may reduce damage to sensitive components of the air conditioning system, for example, the blowers 302, 303, resulting from transmission of vibrations from the door 102 to the air conditioning system 108.

The inner wall 1008 of the door defines an armrest 1017, forming a ledge 1018 projecting generally horizontally towards the passenger cabin 103, thus serving as a rest for an arm of a cabin occupant. As shown in the Figure, the armrest 1017 is generally hollow such that a recess 1019 is defined within the volume of the armrest forming an enlargement to the second compartment 1012. The air conditioning system is mounted to the door with each of the first and second blowers located behind the armrest 1017 of the inner wall 1008, that is to say, mounted to the door on a side of the inner wall 1008 opposite the passenger cabin 103 at approximately the same height as the armrest 1017. In this arrangement the inlet 802 of each blower 302, 303 is aligned with the recess 1019 of the armrest 1017 such that the axis of rotation 806 of each blower extends through the recess 1019. The bend 418, 419 of each of the first and second ducts 401, 402 projects into the recess 1019 defined by the armrest 1017. By projecting into the recess 1019 the radius of curvature of the bend 418, 419 of each of the ducts 401, 402 may be increased. As a result airflow through each duct is turned from the radial direction to the axial direction (relative to the blowers 302, 302) more gradually, and so the restriction to an airflow through each duct 401, 402 is reduced.

In the example, the air conditioning system is configured to draw the first and second airflows in from the passenger cabin through the first and second ducts 401, 402, pass the first and second airflows over the first and second sides 707, 708 respectively of the Peltier device 301, and subsequently discharge the first airflow to the passenger cabin 103 of the vehicle and the second airflow to the first compartment 1011 of the door 104. The first airflow, having been heated or cooled by thermal exchange with the first side 707 of the Peltier device may thus be used to heat or cool the passenger cabin 103. The second airflow, having absorbed waste heat from, or rejected heat to, the second side 708 of the Peltier device, may be discharged from the compartment 1011 of the door 104 to atmosphere.

The first and second ducts 401, 402 are each arranged to draw air from inside the passenger cabin 103. The inlets 410, 411 of the first and second ducts 401, 402 are open through an underside of door 104 to a footwell region 1020 of the passenger cabin 103, such that the first and second blowers 302, 303 may draw first and second airflows from the footwell region 1020 of the passenger cabin 103. The third and fourth ducts 403, 404 are arranged to direct the first and second airflows over the first and second sides 707, 708 respectively of the Peltier device 301. The outlet 428 of the vent 407 of the fifth duct 405 is open through an upper portion of the inner wall 1008 of the door 104 to the passenger cabin 103. Thus, the fifth duct 405 may duct the first airflow to the passenger cabin 103. The sixth duct 406 is arranged to extend through an opening in the partition wall 1009, such that the outlet 427 of the sixth duct 406 is open to the interior of the first compartment 1011. A seal 1018 is provided about the sixth duct 406 to seal between the exterior surface of the duct 406 and the opening in the partition wall 1009. Thus, the sixth duct 406 may duct the second airflow to the compartment 1011 of the door 104.

The fourth and sixth ducts 404, 406, which duct the second airflow are arranged to extend between the third and fifth ducts 403, 405 respectively which duct the first airflow, and the compartment 1011. As a consequence the first airflow within the third and fifth ducts 403, 405, is thermally insulated from the compartment 1011 and from the exterior of the vehicle by the fourth and sixth ducts 404, 406. This has the advantage that the first airflow is thermally insulated from the compartment and the exterior of the vehicle and so is less likely to be undesirably heated or cooled as it flows through the third and fifth ducts. It is particularly desirable that the fifth duct is thermally insulated from the exterior of the vehicle to avoid heating or cooling of the first airflow flowing from the Peltier device to the passenger cabin. Excessive and/or uncontrolled heating or cooling of the first airflow while passing through the fifth duct would complicate control of the passenger cabin air temperature.

As illustrated, the air conditioning system is mounted with the Peltier device extending in generally the same plane as the door 102. The Peltier device is oriented with the first side 707 facing towards the passenger cabin 103 and the second side 708 facing away from the passenger cabin 103 towards the exterior of the vehicle. Mounting the Peltier device with the second side 708 facing away from the passenger cabin 103 towards the exterior of the vehicle has the advantage that 'waste' thermal energy radiated by the second side 708 will tend to radiate primarily outwardly of the passenger cabin rather than into the passenger cabin. Furthermore, this arrangement simplifies the arrangement of the fifth and sixth ducts 405, 406 which duct air from the first side 707 of the Peltier device 301 to the passenger cabin 103 and from the second side 708 to the compartment 1011.

Thus, the first blower 302 may be operated to draw a first airflow from inside the passenger cabin 103 in through the first duct 401. The first blower 302 may then expel the first airflow through the third duct 403, across the first side 707 of the Peltier device 301 where the first airflow may exchange heat energy with the first side 707, and though the fifth duct 405 to inside the passenger cabin 103. Conversely, the second blower 303 may be operated to draw a second airflow from inside the passenger cabin 103 through the second duct 402. The second blower 303 may then expel the second airflow through the fourth duct 404, across the second side 708 of the Peltier device 301 where the second airflow may exchange heat energy with the second side 708, and through the sixth duct 406 to the first compartment 1011 of the door 104. As illustrated, the second airflow flowing through the sixth duct 406 actuates the valve flap 501 of the valve assembly 408 to the open position in which the duct 406 is open to the compartment 1011. The second airflow may subsequently be discharged from the first compartment 1011 to atmosphere via the vent aperture 1016. Thus, an airflow through the door 102 may be established flowing into the compartment 1011 from the sixth duct 406, downwardly through the compartment, and outwardly through the vent aperture 1016 to atmosphere via the channel defined between the underside of the door 104 and the upper surface of the sill 1005. Thus, controlled heating or cooling of the passenger cabin environment may be realised.

As previously mentioned, the foregoing description of air conditioning system 108 and door 102 is applicable also to air conditioning systems 109 to 111 and door 105 to 107. Thus air conditioning systems 109 to 111 are mounted to one of doors 105 to 107 in substantially the same way that air conditioning system 108 is mounted to door 104, and function in substantially the same way as air conditioning system 108.

The invention claimed is:

1. A vehicle comprising:
    a passenger cabin;
    a door to the passenger cabin, the door comprising a first compartment;
    a second compartment;
    an air conditioning system disposed in the second compartment, the air conditioning system comprising:
        a Peltier device;
        one or more blowers that operably receives a first airflow drawn from the passenger cabin and directs the first airflow over a first side of the Peltier device, and the one or more blowers operably receives a second airflow from the passenger cabin and directs the second airflow over a second side of the Peltier device;
        a duct between the first compartment and the second compartment through which the second airflow is directed; and
        a duct between the second compartment and the passenger cabin through which the first air flow is directed;
    wherein at least one of the first and second airflows is drawn from a footwell of the passenger cabin, and
    wherein the first compartment is sealed from the passenger cabin.

2. The vehicle of claim 1, wherein the one or more blowers draw at least one of the first and second airflows from inside the passenger cabin through a duct having an inlet open to the passenger cabin, and wherein the duct is arranged with the inlet located on a downwardly facing surface of the vehicle.

3. The vehicle of claim 1, wherein the air conditioning system comprises one or more filters located upstream of the blowers for filtering the first and second airflows.

4. The vehicle of claim 1, wherein the door to the passenger cabin comprises an inlet is located on an underside of the door.

5. The vehicle of claim 4, wherein the inlet overlies a sill of the vehicle when the door is in a closed position.

6. The vehicle of claim 4, wherein at least one of the Peltier device and the one or more blowers is mounted to the door.

7. The vehicle of claim 1, wherein at least one of the one or more blowers are located downstream of the Peltier device.

8. The vehicle of claim 1, wherein the one or more blowers comprises a first blower for directing the first airflow over the first side of the Peltier device and a second blower for directing the second airflow over a second side of the Peltier device.

9. The vehicle of claim 8, wherein the air conditioning system comprises a controller for controlling independently the first and second blowers.

10. The vehicle of claim 8, wherein the first blower draws the first airflow from inside the passenger cabin through a first duct having an inlet open to the passenger cabin, and the second blower draws the second airflow from inside the passenger cabin through a second duct having an inlet open to the passenger cabin.

11. The vehicle of claim 10, wherein the inlet of the first duct is located adjacent the inlet of the second duct.

12. The vehicle of claim 1, wherein the first compartment comprises a vent for discharging the second airflow to atmosphere.

13. The vehicle of claim 1, wherein the second compartment is disposed in the door immediately adjacent, and interior to, the first compartment.

\* \* \* \* \*